US012594987B2

(12) United States Patent
Schumann et al.

(10) Patent No.: US 12,594,987 B2
(45) Date of Patent: Apr. 7, 2026

(54) ELECTRONIC POWER STEERING SYSTEM RACK FORCE OBSERVER VEHICLE DIAGNOSTICS

(71) Applicants: Continental Automotive Systems, Inc., Auburn Hills, MI (US); Steering Solutions IP Holding Corporation, Auburn Hills, MI (US)

(72) Inventors: Clinton L. Schumann, Holly, MI (US); Scott T. Sanford, Swartz Creek, MI (US); Geoff Bauer, Oxford, MI (US); Joseph A. LaBarbera, Auburn Hills, MI (US)

(73) Assignee: Steering Solutions IP Holding Corporation, Auburn Hills, MI (US)

( * ) Notice: Subject to any disclaimer, the term of this patent is extended or adjusted under 35 U.S.C. 154(b) by 385 days.

(21) Appl. No.: 17/188,388

(22) Filed: Mar. 1, 2021

(65) Prior Publication Data

US 2022/0274640 A1 Sep. 1, 2022

(51) Int. Cl.
*B62D 5/04* (2006.01)
*B62D 15/02* (2006.01)
(Continued)

(52) U.S. Cl.
CPC ........... *B62D 5/0481* (2013.01); *B62D 5/046* (2013.01); *B62D 15/021* (2013.01); *G01S 19/42* (2013.01); *G07C 5/0808* (2013.01); *G07C 5/0816* (2013.01)

(58) Field of Classification Search
CPC ........ B62D 5/0481; B62D 5/046; G01S 19/42
See application file for complete search history.

(56) References Cited

U.S. PATENT DOCUMENTS 10,046,743 B2 8/2018 Jonasson et al.
10,046,749 B2 8/2018 Jonasson et al.
(Continued)

FOREIGN PATENT DOCUMENTS

CN 101484347 A 7/2009
CN 103118922 A 5/2013
(Continued)

OTHER PUBLICATIONS

"Kreis, Method for monitoring a steering system for a motor car, involves determining state of thrust element based on detected operating amount of steering system, 2014" NPL attached (Year: 2014).*

(Continued)

*Primary Examiner* — Abby J Flynn
*Assistant Examiner* — Bakari Underwood
(74) *Attorney, Agent, or Firm* — Ingrassia Fisher & Lorenz, LLP

(57) ABSTRACT

A number of illustrative variations may include a method for use in a vehicle having an electronic steering system, a position control module, an electronic steering system rack force observer, and a rack force observer vehicle diagnostic, wherein the method includes the steps of providing a vehicle that may include an electronic steering system, a position control module, an electronic steering system rack force observer, and a rack force observer vehicle diagnostic; measuring the steering angle and steering velocity of the vehicle; communicating a steering angle of the vehicle to the position control module and the electronic steering system rack force observer; communicating a steering velocity of the vehicle to the electronic steering system rack force observer; communicating electronic steering system motor commands to the electronic steering system rack force observer; and estimating rack force data and communicating (Continued)

the rack force data to the rack force observer vehicle diagnostic; and determining a compensated target steering angle.

16 Claims, 3 Drawing Sheets

(51) Int. Cl.
*G01S 19/42* (2010.01)
*G07C 5/08* (2006.01)

(56) References Cited

U.S. PATENT DOCUMENTS

| 2005/0236894 | A1 | | 10/2005 | Lu et al. | |
| 2010/0268422 | A1 | * | 10/2010 | Blommer | B62D 5/0472 |
| | | | | | 701/44 |
| 2012/0203397 | A1 | * | 8/2012 | Michelis | B62D 6/008 |
| | | | | | 701/1 |
| 2017/0158227 | A1 | * | 6/2017 | Katzourakis | B62D 6/008 |
| 2017/0305458 | A1 | * | 10/2017 | Wang | B62D 6/001 |
| 2021/0221430 | A1 | * | 7/2021 | Mannava | B62D 5/0472 |
| 2022/0135121 | A1 | * | 5/2022 | John | B62D 6/008 |
| | | | | | 701/32.9 |

FOREIGN PATENT DOCUMENTS

| CN | 101716951 B | * | 6/2013 | | B62D 5/0472 |
| CN | 106125722 A | | 11/2016 | | |
| DE | 102007000995 A1 | | 6/2009 | | |
| DE | 102011055339 A1 | | 5/2013 | | |
| DE | 102012107597 A1 | | 2/2014 | | |
| DE | 102012022801 A1 | * | 5/2014 | | B62D 3/123 |
| WO | 2020187485 A1 | | 9/2020 | | |

OTHER PUBLICATIONS

"Jens Dornhege, Compensation for steering force disturbance variable, Jun. 5, 2013" (Year: 2013).*

English Translation of German Office Action dated Aug. 19, 2022; Application No. 102021110308.8; Applicant: Continental Automotive Systems, Inc. et al.; 10 pages.

English Translation of German Office Action dated Nov. 5, 2021 ; Application No. 102021110308.8; Applicant: Continental Automotive Systems, Inc. et al.; 5 pages.

CN Office action dated Nov. 29, 2023 for CN application No. 202010989156.2.

CN Office action dated Aug. 29, 2024 for CN application No. 202110489433.8.

* cited by examiner

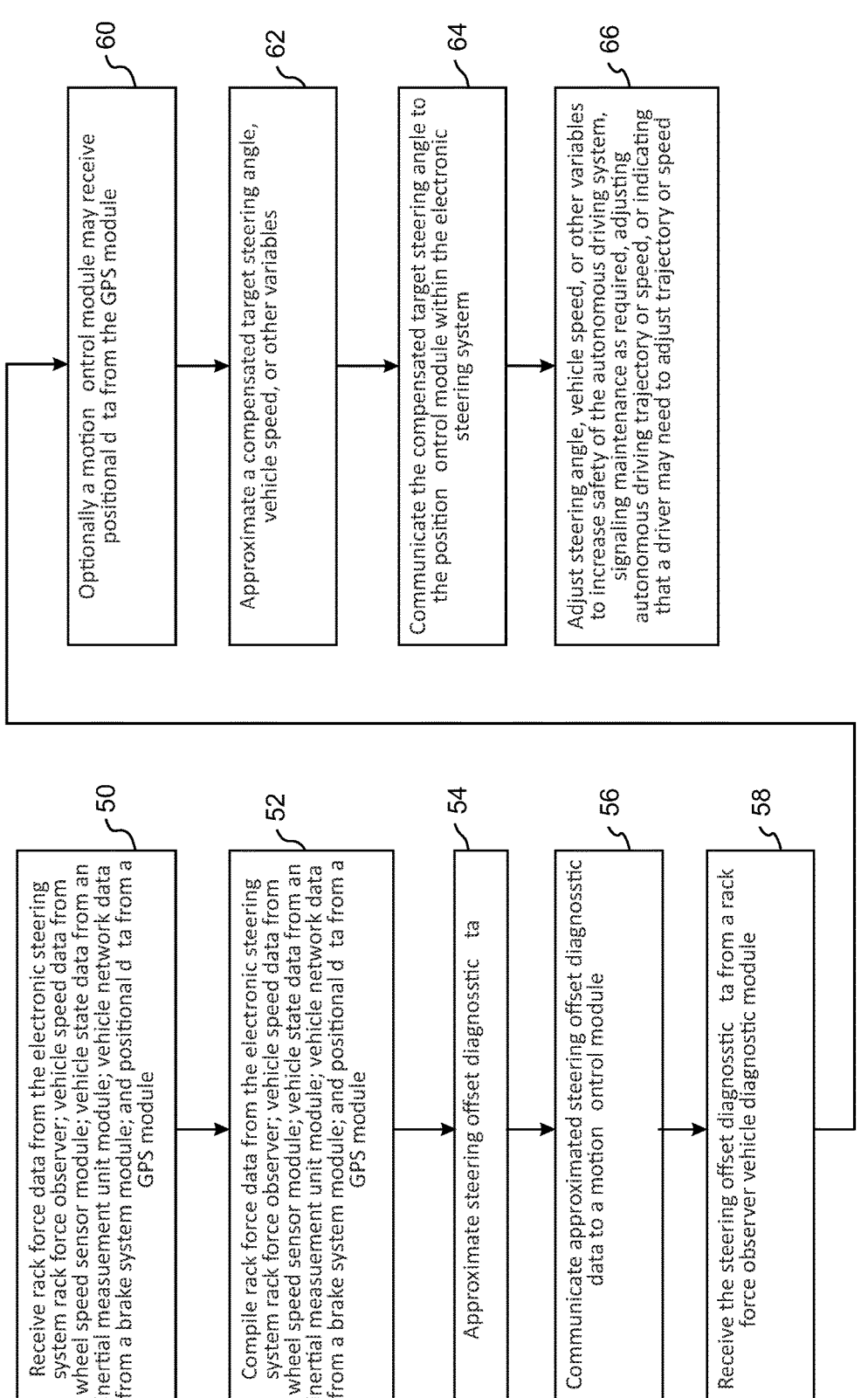

Receive rack force data from the electronic steering system rack force observer; vehicle speed data from wheel speed sensor module; vehicle state data from an inertial measuement unit module; vehicle network data from a brake system module; and positional data from a GPS module

50

Compile rack force data from the electronic steering system rack force observer; vehicle speed data from wheel speed sensor module; vehicle state data from an inertial measuement unit module; vehicle network data from a brake system module; and positional data from a GPS module

52

Approximate steering offset diagnosstic data

54

Communicate approximated steering offset diagnostic data to a motion control module

56

Receive the steering offset diagnosstic data from a rack force observer vehicle diagnostic module

58

Optionally a motion control module may receive positional data from the GPS module

60

Approximate a compensated target steering angle, vehicle speed, or other variables

62

Communicate the compensated target steering angle to the position control module within the electronic steering system

64

Adjust steering angle, vehicle speed, or other variables to increase safety of the autonomous driving system, signaling maintenance as required, adjusting autonomous driving trajectory or speed, or indicating that a driver may need to adjust trajectory or speed

ELECTRONIC POWER STEERING SYSTEM RACK FORCE OBSERVER VEHICLE DIAGNOSTICS

TECHNICAL FIELD

The field to which the disclosure generally relates to includes vehicles steering systems.

BACKGROUND

Vehicles may include steering systems. Autonomous driving and steering systems typically associated with "self-driving vehicles" may include electronic steering systems that may rely primarily upon steering angle for autonomous control of a vehicle and maintaining or changing the direction in which a vehicle is traveling.

SUMMARY OF ILLUSTRATIVE VARIATIONS

A method for use in a vehicle that may have an electronic steering system, a position control module, an electronic steering system rack force observer, and a rack force observer vehicle diagnostic, wherein the method may include measuring the steering angle and steering velocity of the vehicle; communicating a steering angle of the vehicle to the position control module and the electronic steering system rack force observer; communicating a steering velocity of the vehicle to the electronic steering system rack force observer; communicating electronic steering system motor commands to the electronic steering system rack force observer; and estimating rack force data and communicating the rack force data to the rack force observer vehicle diagnostic; and determining a compensated target steering angle.

A method for use in a vehicle having an electronic steering system, a position control module, an electronic steering system rack force observer, and a rack force observer vehicle diagnostic, wherein the method may include receiving rack force data from an electronic steering system rack force observer; receiving vehicle speed data from a wheel speed sensor module; vehicle state data from an inertial measurement unit module; vehicle network data from a brake system module; and positional data from a GPS module; analyzing rack force data from the electronic steering system rack force observer; vehicle speed data from the wheel speed sensor modules; vehicle state data from an inertial measurement unit module; vehicle network data from a brake system module; and positional data from the GPS module; approximating steering offset diagnostic data; communicating the approximated steering offset diagnostic data to a motion control module; receiving the steering offset diagnostic data from a rack force observer vehicle diagnostic module; and approximating a compensated target steering angle.

A method may include the steps of providing an electronic power steering system that may include a steering rack; at least one wheel; a brake system module; a wheel speed sensor module; an inertial measurement unit module; a position control module; a motion control module; a GPS module; an electronic steering system rack force observer; a rack force observer vehicle diagnostic; at least one computing device; memory that stores computer-executable components; a processor that executes the computer-executable components stored in the memory. The computer-executable components when executed by the processor may perform a method including receiving and analyzing rack force data from the electronic steering system rack force observer; vehicle speed data from the wheel speed sensor module; vehicle state data from the inertial measurement unit module; vehicle network data from the brake system module; and positional data from the GPS module; approximating steering offset diagnostic data; communicating the steering offset diagnostic data to the motion control module; approximating a compensated target steering angle; communicating the compensated target steering angle to the position control module; and adjusting the steering angle of the at least one wheel.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 3 illustrates a flow diagram illustrating an electronic steering system enabling the approximation of a compensated target steering angle and the adjustment of vehicle steering angle.

DETAILED DESCRIPTION OF ILLUSTRATIVE VARIATIONS

Figure 1:
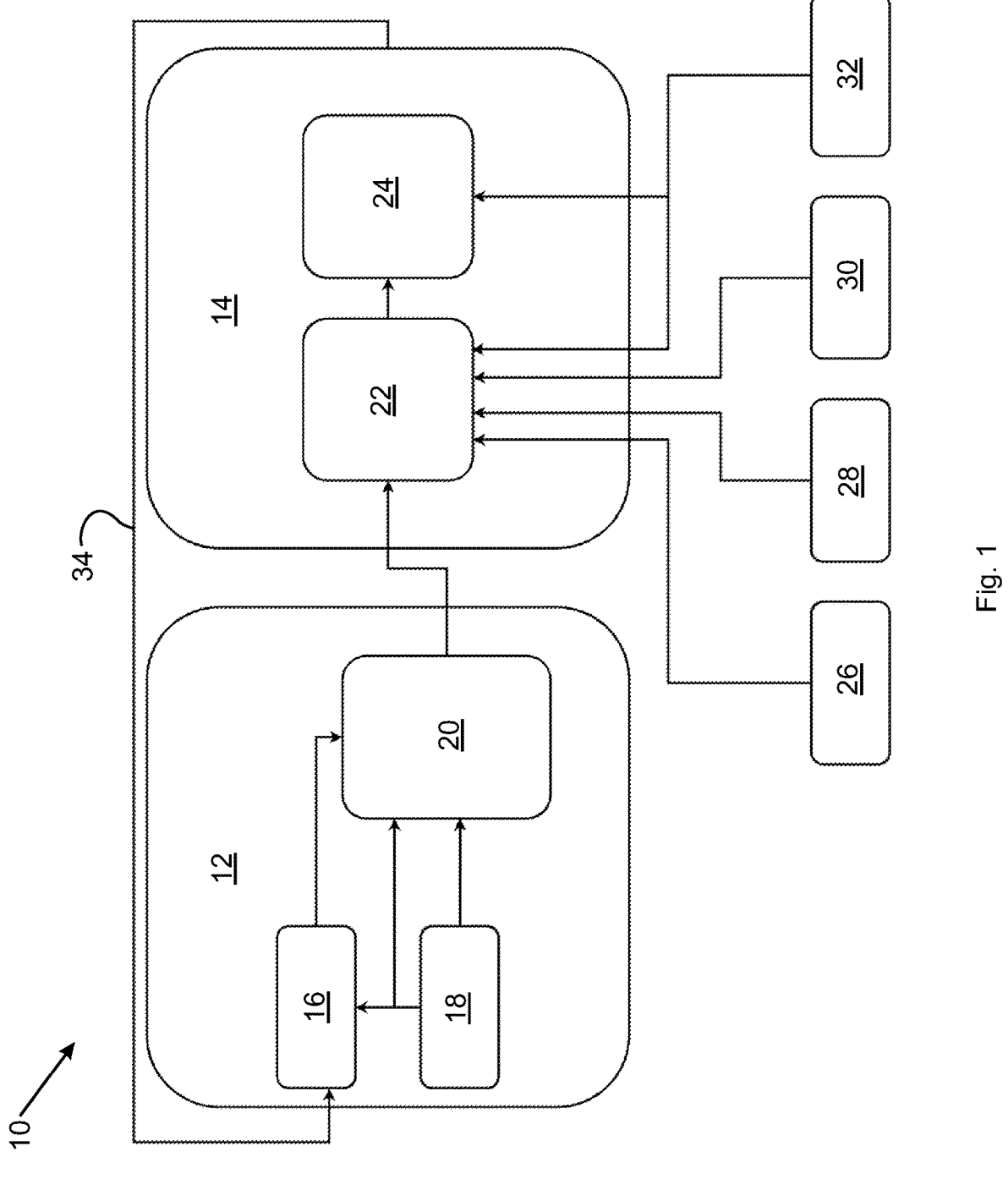
FIG. 1 depicts an illustrative variation of a product including an electronic steering system equipped with hardware sufficient for carrying out at least some of the methods described herein.

The following description of the variations is merely illustrative in nature and is in no way intended to limit the scope of the invention, its application, or uses.

As used herein, "vehicle" may refer broadly to cargo or passenger vehicles, automobiles, aerial vehicles such as drones, planes, and both manned and unmanned variations thereof.

As used herein, "operating environment" may refer broadly to roadways, highways, streets, paths, parking lots, parking structures, tunnels, bridges, traffic intersections, residential garages, or commercial garages. It is contemplated that the operating environment may include any location or space accessible by a vehicle.

In a number of illustrative variations, a vehicle may comprise an electronic steering system. In such cases, the steering system may be manually operable by the driver via a steering interface, autonomously operable by an autonomous steering system, or operable as a combination of autonomous and manual steering wherein the steering system is configured to receive and interpret steering input from a driver, the autonomous steering system, or both at the same time.

In a number of illustrative variations, a steering interface may comprise a hand wheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel, steering rack, and road wheels. The steering system may be of the electric power steering type wherein physical linkages mechanically communicate a manipulation of the steering interface to the steerable propulsion system. The steering system may be of the steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers and electronically excited actuators.

In a number of illustrative variations, an electronic steering system in an autonomous driving vehicle may affect the trajectory of the vehicle via a motion control system that may include a plurality of sensors. The plurality of sensors may measure and/or observe a variety of road travel factors such as vehicle speed, wheel speed, wheel angle, yaw rate, acceleration, roll angle, pitch angle, braking system activity, global positioning systems (GPS) and data, as well as other measurable variables relating to vehicle travel. The electronic steering system in an autonomous driving vehicle may measure steering angle position to determine trajectory. As an example, an autonomous driving vehicle may determine that a vehicle making a turn must adjust the steering angle "X" degrees to complete an autonomous turn. The electronic steering system in an autonomous driving vehicle may measure forces on the steering rack of a vehicle or may calculate approximate forces on the steering rack through a rack force observer. The rack force observer may monitor electric current inside the electronic steering system relative to an electric motor position to approximate forces on the steering rack. In this way, sudden changes in rack forces due to outside influences originating in the operating environment may be observed and measure and subsequently compensated for.

In a number of illustrative variations, a vehicle having an electronic steering system may measure, observe, collect, or approximate forces on the steering rack of a vehicle in addition to factors such as vehicle speed, wheel speed, wheel angle, yaw rate, acceleration, roll angle, pitch angle, braking system activity, global positioning systems (GPS) and data and other factors. A motion control system in combination with modules such as position controllers, steering rack force observers, motion controllers, motion position sensors, brake system sensors, inertial measurement unit(s) (IMU), GPS, and various other systems may measure or approximate disturbances that may affect wheel angle and rack force which originate from the operating environment of the vehicle. For example, a motion control system measuring vehicle wheel angle at approximately parallel with vehicle trajectory, but which also measures or approximates rack forces greater than expected may determine dynamic situations such as adverse driving conditions, failure of a component within the electronic steering system, or other conditions. Disturbance in steering rack forces may be determined by monitoring steering angle position and steering angle compensation relative to a straight position and which may be confirmed by secondary vehicles sensors like wheel speed sensors, vehicle heading, yaw rate, and lateral acceleration sensors.

The measured steering rack force in conjunction with the measured steering position may provide an abundant amount of information to the vehicle that may not otherwise be measured or observed. The system may assist with situation recognition and diagnose when vehicle maintenance is needed. Dynamic situations may be recognized such as braking on split-mu surfaces, torque steer during on-throttle, lifted wheel with high lateral acceleration, tire blowout, and off/on camber and crowned roads. Suspension and tire diagnosis may also be recognized such as deteriorating ball joints, tie rod ends, shocks, brake rotor issues, tire imbalance, and tire inflation. The cause of a disturbance may be recognized from information from the steering angle position (including compensation), rack load forces, and with the help of other vehicle sensors like wheel speed sensors, and lateral acceleration. The situation recognition may then be communicated to and used by systems thru-out the vehicle including signaling maintenance as required, adjusting autonomous driving trajectory or speed, or indicating that a driver may need to adjust trajectory or speed when a motion control system cannot.

Referring to FIG. 1, an illustrative variation of a product may include an electronic power steering system 10 including an electronic roadwheel actuator 12 and a motion control system 14. The motion control system 14, and/or electronic power steering system may include at least one computing device; memory that stores computer-executable components; a processor that executes the computer-executable components stored in the memory. The electronic road wheel actuator 12 may include a position control module 16, a motion position sensor 18, an electronic steering rack force observer 20. The motion control system 14 may include a rack force observer vehicle diagnostic 22 and a motion controller 24.

The motion position sensor 18 may communicate the steering angle of the vehicle to the position control module 16 and the electronic steering system rack force observer 20. The motion position sensor 18 may communicate steering velocity to the electronic steering system rack force observer 20. The position control module 16 may communicate the electronic steering system motor commands to the electronic steering system rack force observer 20. The position control module 16 may include a position control, torque control, or torque overlay architecture. The electronic steering system rack force observer 20 may measure or estimate rack force data and communicate the rack force to the rack force observer vehicle diagnostic 22 within the motion control system 14.

Within the motion control system 14, the rack force observer vehicle diagnostic 22 may receive rack force data from the electronic steering system rack force observer 20; vehicle speed data from wheel speed sensor module 26; vehicle state data from an inertial measurement unit module 28; vehicle network data from a brake system module 30; and positional data from a GPS module 32. The rack force observer vehicle diagnostic 22 may analyze rack force data from the electronic steering system rack force observer 20; vehicle speed data from wheel speed sensor module 26; vehicle state data from an inertial measurement unit module 28; vehicle network data from a brake system module 30; and positional data from a GPS module 32 to calculate or approximate steering offset diagnostic data which may then be communicated to the motion control module 24. The motion control module 24 may receive the steering offset diagnostic data from the rack force observer vehicle diagnostic module 22 and may also receive positional data from the GPS module 32 to calculate or approximate a compensated target steering angle 34 which may be communicated to the position control module 16 within the electronic steering system roadwheel actuator 12.

Compensated target steering angle data 34 received by the position control module 16 may be used to adjust steering angle, vehicle speed, or other variables to increase safety of the autonomous driving system, signaling maintenance as required, adjusting autonomous driving trajectory or speed, or indicating that a driver may need to adjust trajectory or speed when a motion control system cannot.

Figure 2:
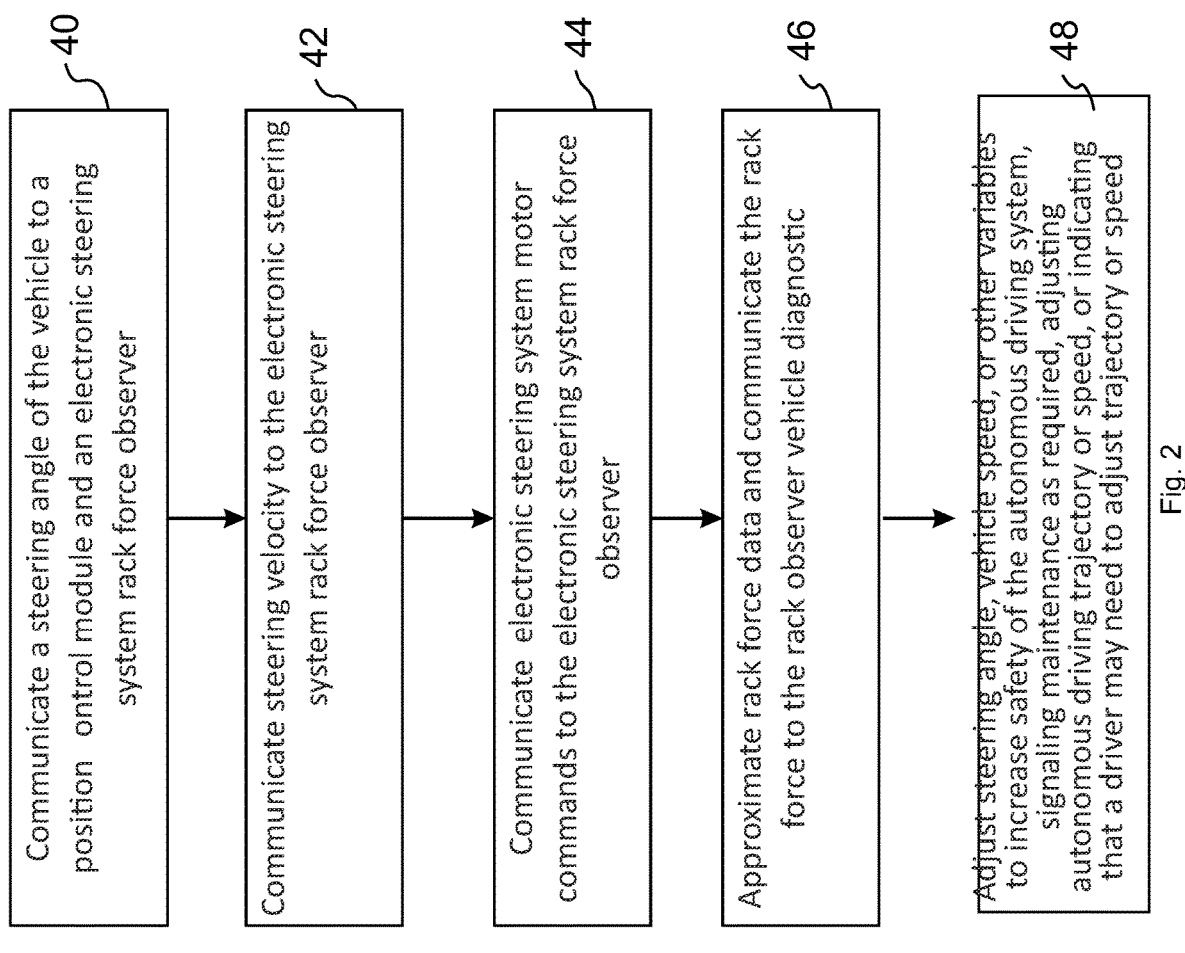
FIG. 2 illustrates a flow diagram illustrating an example process of a system enabling the approximation of a compensated target steering angle and the adjustment of vehicle steering angle.

FIG. 2 is a flow diagram illustrating an example process of a motion control system including an electronic steering system enabling the approximation of a compensated target steering angle and the adjustment of vehicle steering angle. The motion control system and/or electronic power steering system may include at least one computing device; memory that stores computer-executable components; a processor that executes the computer-executable components stored in the memory, wherein the computer-executable components may include steps. Step 40 may include measuring and communicating a steering angle of a vehicle to a position control module and an electronic steering system rack force observer. Step 42 may include measuring and communicating steering velocity to the electronic steering system rack force observer. Step 44 may include communicating electronic steering system motor commands to the electronic steering system rack force observer. Step 46 may include estimating rack force data and communicating the rack force data to the rack force observer vehicle diagnostic. Step 48 may include adjusting the steering angle, vehicle speed, or other variables to increase the safety of an autonomous driving vehicle. Step 48 may further include signaling to a user that maintenance of the vehicle may be required, adjusting autonomous driving trajectory or speed, or indicating that a driver may need to adjust trajectory or speed.

FIG. 3 is a flow diagram illustrating an example process of a motion control system including an electronic steering system enabling the approximation of a compensated target steering angle and the adjustment of vehicle steering angle. The motion control system and/or electronic power steering system may include at least one computing device; memory that stores computer-executable components; a processor that executes the computer-executable components stored in the memory, wherein the computer-executable components may include steps. Step 50 may include receiving rack force data from an electronic steering system rack force observer. Step 50 may also include receiving vehicle speed data from a wheel speed sensor module; vehicle state data from an inertial measurement unit module; vehicle network data from a brake system module; and positional data from a GPS module. Step 52 may include analyzing rack force data from the electronic steering system rack force observer; vehicle speed data from the wheel speed sensor modules; vehicle state data from an inertial measurement unit module; vehicle network data from a brake system module; and positional data from the GPS module. Step 54 may include approximating steering offset diagnostic data based on data received during step 50 and step 52. Step 56 may include communicating the approximated steering offset diagnostic data to a motion control module. Step 58 may include receiving the steering offset diagnostic data from a rack force observer vehicle diagnostic module. Step 60 may include optionally receiving positional data from a GPS module and communicating the positional data to the motion control module. Step 62 may include approximating a compensated target steering angle, vehicle speed or other variables. Step 64 may include communicating the compensated target steering angle to the position control module within the electronic steering system. Step 66 may include adjusting the steering angle, vehicle speed, or other variables to increase safety of the autonomous driving vehicle including an electronic steering system. Step 66 may further include signaling maintenance as required, adjusting autonomous driving trajectory or speed, or indicating that a user may need to adjust trajectory or speed.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

According to variation 1, a method for use in a vehicle having an electronic steering system, a position control module, an electronic steering system rack force observer, and a rack force observer vehicle diagnostic, wherein the method may include measuring the steering angle and steering velocity of the vehicle; communicating a steering angle of the vehicle to the position control module and the electronic steering system rack force observer; communicating a steering velocity of the vehicle to the electronic steering system rack force observer; communicating electronic steering system motor commands to the electronic steering system rack force observer; and estimating rack force data and communicating the rack force data to the rack force observer vehicle diagnostic; and determining a compensated target steering angle.

Variation 2 may include a method as set forth in variation 1 and further may include adjusting the steering angle of the vehicle.

Variation 3 may include a method as set forth in any of variations 1 through 2 and may further include signaling to a user that maintenance of the vehicle is required.

Variation 4 may include a method as set forth in any of variations 1 through 3 and may further include signaling to a user that adjusting driving trajectory or speed is required.

Variation 5 may include a method for use in a vehicle having an electronic steering system, a position control module, an electronic steering system rack force observer, and a rack force observer vehicle diagnostic, wherein the method may include receiving rack force data from an electronic steering system rack force observer; receiving vehicle speed data from a wheel speed sensor module; vehicle state data from an inertial measurement unit module; vehicle network data from a brake system module; and positional data from a GPS module; analyzing rack force data from the electronic steering system rack force observer; vehicle speed data from the wheel speed sensor modules; vehicle state data from an inertial measurement unit module; vehicle network data from a brake system module; and positional data from the GPS module; approximating steering offset diagnostic data; communicating the approximated steering offset diagnostic data to a motion control module; receiving the steering offset diagnostic data from a rack force observer vehicle diagnostic module; and approximating a compensated target steering angle.

Variation 6 may include a method as set forth in variation 5 and may further include receiving positional data from a GPS module and communicating the positional data to the motion control module prior to approximating a compensated target steering angle, vehicle speed or other variables.

Variation 7 may include a method as set forth in any of variations 5 through 6 and may further include communicating the compensated target steering angle to the position control module.

Variation 8 may include a method as set forth in any of variations 5 through 7 and may further include adjusting the steering angle of the vehicle.

Variation 9 may include a method as set forth in any of variations 5 through 8 and may further include signaling to a user that maintenance of the vehicle is required.

Variation 10 may include a method as set forth in any of variations 5 through 9 and may further include signaling to a user that adjusting driving trajectory or speed is required.

Variation 11 may include an electronic power steering system that may include a steering rack; at least one wheel; a brake system module; a wheel speed sensor module; an inertial measurement unit module; a position control module; a motion control module; a GPS module; an electronic steering system rack force observer; a rack force observer vehicle diagnostic; at least one computing device; memory that stores computer-executable components; a processor that executes the computer-executable components stored in the memory. The computer-executable components when executed by the processor may causes the acts of: receiving and analyzing rack force data from the electronic steering system rack force observer; vehicle speed data from the wheel speed sensor module; vehicle state data from the inertial measurement unit module; vehicle network data from the brake system module; and positional data from the GPS module; approximating steering offset diagnostic data; communicating the steering offset diagnostic data to the motion control module; approximating a compensated target steering angle; communicating the compensated target steering angle to the position control module; and adjusting the steering angle of the at least one wheel.

The above description of select variations within the scope of the invention is merely illustrative in nature and, thus, variations or variants thereof are not to be regarded as a departure from the spirit and scope of the invention.

What is claimed is:

1. A method for use in a vehicle having an electronic steering system, a position control module, an electronic steering system rack force observer, and a rack force observer vehicle diagnostic module, wherein the method comprising:

using the electronic steering system rack force observer to perform the acts of monitoring electric current inside the electronic steering system relative to an electric motor position, calculating rack force data on a steering rack using the monitored electric current inside the electronic steering system relative to an electric motor position, determining when the calculated rack force is unexpected;

receiving rack force data from the electronic steering system rack force observer;

receiving vehicle speed data from a wheel speed sensor module; vehicle state data from an inertial measurement unit module; vehicle network data from a brake system module; and positional data from a GPS module;

analyzing rack force data from the electronic steering system rack force observer; the vehicle speed data from the wheel speed sensor modules; the vehicle state data from the inertial measurement unit module; the vehicle network data from the brake system module; and the positional data from the GPS module;

calculating steering offset diagnostic data by measuring at least one of a steering angle or a steering velocity of the vehicle relative to at least one of a straight position;

communicating the calculated steering offset diagnostic data to a motion control module;

receiving the steering offset diagnostic data from the rack force observer vehicle diagnostic module; and calculating a compensated target steering angle based on rack force data relative to the straight position of the steering angle to account for sudden changes in rack forces, and adjusting the steering angle of the vehicle based on the calculated compensated target steering angle when the calculated rack force is unexpected based upon the measured steering angle.

2. The method as set forth in claim 1, further comprising: communicating the positional data to the motion control module prior to calculating the compensated target steering angle.

3. The method as set forth in claim 2, further comprising: communicating the calculated compensated target steering angle to the position control module.

4. The method as set forth in claim 3, further comprising: adjusting the steering angle of the vehicle.

5. The method as set forth in claim 1, further comprising: signaling to a user that maintenance of the vehicle is required.

6. The method as set forth in claim 1, further comprising: signaling to a user that adjusting driving trajectory or speed is required.

7. A method as in claim 1, further comprising:
analyzing environmental condition data; and
adjusting the calculated compensated target steering angle based on both the rack force data and the environmental condition data to account for changes in road surface or weather conditions.

8. The method as in claim 1, further comprising:
storing historical rack force data and corresponding steering compensation values; and
using the stored historical rack force data to update a predictive model that estimates future rack force anomalies to improve compensated target steering angle calculation.

9. The method as in claim 1, further comprising: detecting lateral acceleration exceeding a predetermined threshold; and in response to the threshold being exceeded, modifying the frequency of rack force monitoring to increase sample rate.

10. The method as in claim 1, further comprising:
verifying that the calculated rack force is unexpected by comparing with other sensor data to confirm the presence of a disturbance.

11. An electronic power steering system comprising: a steering rack;
  at least one wheel;
  a brake system module;
  a wheel speed sensor module;
  an inertial measurement unit module; a position control module;
  a motion control module; a GPS module;
  an electronic steering system rack force observer;
  a rack force observer vehicle diagnostic module;
  at least one computing device;
  memory that stores computer-executable components;
  a processor that executes the computer-executable components stored in the memory, wherein the computer-executable components when executed by the processor cause the acts of:
  receiving and analyzing rack force data from the electronic steering system rack force observer; vehicle speed data from the wheel speed sensor module; vehicle state data from the inertial measurement unit module; vehicle network data from the brake system module; and positional data from the GPS module;

using the electronic steering system rack force observer to perform the acts of monitoring electric current inside the electronic steering system relative to an electric motor position, calculating rack force data on a steering rack using the monitored electric current inside the electronic steering system relative to an electric motor position, determining when the calculated rack force is unexpected;

calculating steering offset diagnostic data by measuring at least one of a steering angle or a steering velocity of the vehicle relative to a straight position, vehicle speed data from the wheel speed sensor module, vehicle state data from the inertial measurement unit module, vehicle network data from the brake system module, or position data from the GPS module;

communicating the steering offset diagnostic data to the motion control module;

calculating a compensated target steering angle based on rack force data relative to the straight position of the steering angle to account for sudden changes in rack forces;

communicating the calculated compensated target steering angle to the position control module; and adjusting the steering angle of the at least one wheel based on the calculated compensated target steering angle when the calculated rack force data is unexpected based upon the measured steering angle.

12. The electronic power steering system as set forth in claim 11 wherein the acts further comprise communicating the positional data to the motion control module prior to calculating the compensated target steering angle.

13. The electronic power steering system as set forth in claim 11, wherein the acts further comprise signaling to a user that maintenance of the vehicle is required.

14. The electronic power steering system as set forth in claim 11, wherein the acts further comprise signaling to a user that adjusting driving trajectory or speed is required.

15. An electronic power steering system as in claim 11, wherein the processor is further configured to:

classify a type of rack force disturbance using a disturbance classification module based on pattern recognition of steering rack forces, and select a steering compensation strategy from a predefined set based on the classified disturbance type.

16. An electronic power steering system comprising: a steering rack;

at least one wheel;

a brake system module;

a wheel speed sensor module;

an inertial measurement unit module;

a position control module;

a motion control module; a GPS module;

an electronic steering system rack force observer;

a rack force observer vehicle diagnostic module;

at least one computing device;

memory that stores computer-executable components;

a processor that executes the computer-executable components stored in the memory, wherein the computer-executable components when executed by the processor cause the acts of:

receiving and analyzing rack force data from the electronic steering system rack force observer; vehicle speed data from the wheel speed sensor module; vehicle state data from the inertial measurement unit module; vehicle network data from the brake system module; and positional data from the GPS module;

using the electronic steering system rack force observer to perform the acts of monitoring electric current inside the electronic steering system relative to an electric motor position, calculating rack force data on a steering rack using the monitored electric current inside the electronic steering system relative to an electric motor position, determining when the calculated rack force is unexpected;

calculating steering offset diagnostic data by measuring at least one of a steering angle or a steering velocity of the vehicle relative to at least one of a straight position, vehicle speed data from the wheel speed sensor module, vehicle state data from the inertial measurement unit module, vehicle network data from the brake system module, or position data from the GPS module;

communicating the steering offset diagnostic data to the motion control module;

receiving the steering offset diagnostic data from the rack force observer vehicle diagnostic module;

calculating a compensated target steering angle based on rack force data relative to the straight position of the steering angle to account for sudden changes in rack forces;

communicating the calculated compensated target steering angle to the position control module; and adjusting the steering angle of the at least one wheel based on the calculated compensated target steering angle when the rack force data is unexpected based upon the measured steering angle.

* * * * *